US 8,112,403 B2

(12) United States Patent
Repasi et al.

(10) Patent No.: US 8,112,403 B2
(45) Date of Patent: *Feb. 7, 2012

(54) PROVIDING A RATING FOR A WEB SITE BASED ON WEIGHTED USER FEEDBACK

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 11/803,922

(22) Filed: May 16, 2007

(65) Prior Publication Data

US 2007/0271246 A1 Nov. 22, 2007

Related U.S. Application Data

(60) Provisional application No. 60/801,894, filed on May 19, 2006.

(51) Int. Cl.
G06F 7/00 (2006.01)
G06F 17/30 (2006.01)

(52) U.S. Cl. .................... 707/705; 705/26.7
(58) Field of Classification Search .................. None
See application file for complete search history.

(56) References Cited

U.S. PATENT DOCUMENTS

| | | | | |
|---|---|---|---|---|
| 4,996,642 A | * | 2/1991 | Hey | 705/10 |
| 6,041,323 A | * | 3/2000 | Kubota | 707/5 |
| 6,314,420 B1 | * | 11/2001 | Lang et al. | 1/1 |
| 6,785,676 B2 | * | 8/2004 | Oblinger | 707/5 |
| 6,954,755 B2 | * | 10/2005 | Reisman | 707/10 |
| 6,963,850 B1 | * | 11/2005 | Bezos et al. | 705/26 |
| 7,403,910 B1 | * | 7/2008 | Hastings et al. | 705/26 |
| 7,467,349 B1 | * | 12/2008 | Bryar et al. | 715/205 |
| 7,478,121 B1 | * | 1/2009 | Nickerson et al. | 709/203 |
| 7,519,562 B1 | * | 4/2009 | Vander Mey et al. | 705/500 |

(Continued)

FOREIGN PATENT DOCUMENTS

WO 2004066180 8/2004

OTHER PUBLICATIONS

Wang et al., Dynamic Rules' Score Adjustment in Spam Filter Using Users' Feedback, 2005, IEEE, vol. 2, pp. 665-669.*

*Primary Examiner* — Wilson Lee
*Assistant Examiner* — Jessica N Le
(74) *Attorney, Agent, or Firm* — Holland & Hart LLP

(57) ABSTRACT

A method of (and associated system and computer program product for) providing a rating for a web site (205). The rating is obtained from a plurality of member users. A member user (405) submits (320) feedback data (215), that may be stored in a database (220), using an interface (415) provided on a member user terminal (210), the feedback data (215) related to the web site. A member user submitting feedback data (215) has a member user weighting, a member user weighting is preferably obtained (330) from one or more other member users, or may be initially allocated as a default weighting. The rating for the web site (205) is determined (340) at least partially based on the feedback data (215) and the member user weighting of the member user who submitted the feedback data (215). The rating may be determined or adjusted by feedback data and respective member user weightings received from other member users.

15 Claims, 6 Drawing Sheets

U.S. PATENT DOCUMENTS

| | | | |
|---|---|---|---|
| 7,562,304 B2 * | 7/2009 | Dixon et al. | 715/738 |
| 7,865,522 B2 * | 1/2011 | Purdy et al. | 707/790 |
| 2002/0120609 A1 * | 8/2002 | Lang et al. | 707/1 |
| 2004/0030697 A1 * | 2/2004 | Cochran et al. | 707/9 |
| 2004/0111353 A1 * | 6/2004 | Ellis et al. | 705/36 |
| 2005/0021390 A1 * | 1/2005 | Porter et al. | 705/10 |
| 2005/0193333 A1 * | 9/2005 | Ebert | 715/517 |
| 2006/0026593 A1 * | 2/2006 | Canning et al. | 718/100 |
| 2006/0074843 A1 * | 4/2006 | Pereira | 707/1 |
| 2006/0095570 A1 * | 5/2006 | O'Sullivan | 709/224 |
| 2006/0107956 A1 | 5/2006 | Hendricksen et al. | |
| 2006/0129446 A1 * | 6/2006 | Ruhl et al. | 705/10 |
| 2006/0224442 A1 * | 10/2006 | Round et al. | 705/12 |
| 2006/0287997 A1 * | 12/2006 | Rugh | 707/5 |
| 2007/0118430 A1 * | 5/2007 | Wiseman et al. | 705/26 |
| 2007/0118802 A1 * | 5/2007 | Gerace et al. | 715/738 |
| 2007/0124698 A1 * | 5/2007 | Majumder | 715/811 |
| 2007/0156636 A1 * | 7/2007 | Norton et al. | 707/1 |
| 2007/0239701 A1 * | 10/2007 | Blackman et al. | 707/5 |
| 2008/0015925 A1 * | 1/2008 | Sundaresan | 705/10 |
| 2008/0235204 A1 * | 9/2008 | Dai et al. | 707/5 |
| 2009/0234878 A1 * | 9/2009 | Herz et al. | 707/102 |

* cited by examiner

PROVIDING A RATING FOR A WEB SITE BASED ON WEIGHTED USER FEEDBACK

This application claims the benefit of priority from Provisional Application Ser. No. 60/801,894, filed on May 19, 2006, which is hereby incorporated by reference in its entirety.

TECHNICAL FIELD

The present invention generally relates to rating or ranking of web sites or services provided by such web sites, and more particularly to a method, system and/or computer product for providing a rating or ranking for a web site, or an associated service, obtained from one or more member users.

BACKGROUND ART

Presently, users of web sites, have no way of readily determining the quality of the web site, or a service provided by the web site, before viewing or using the web site or subscribing to the service. Users are often hesitant to download software products from a web site, register for services provided by a web site, or purchase products from a web site, for example, as an online purchase, without obtaining some comfort concerning the quality or trustworthiness of the web site or the services provided by the web site.

Currently, users are required to effectively manually research each potential web site or service of interest to the user. Currently available options to a user include: reading web forums; reading reviews on the Internet; reading reviews in print (for example, in magazines); or browsing the content of web sites.

When searching for a web site users are presently required to navigate to each web site of interest (which may simply be a web page) and use their own judgement, or do their own research, concerning the quality of the web site before downloading and installing software, purchasing products, registering for services or the like. If a user does not exercise sufficient caution the user runs a significant risk of falling victim to a scam, fraud, or purchasing low quality products or services.

A type of known web site rating is provided by Google's™ PageRank system (see U.S. Pat. No. 6,285,999). PageRank uses links from other web pages to determine the importance (and to a lesser extent, quality) of a web page. Each link from another web page to a particular web page is counted as a 'vote', the more votes a web page receives, the higher likelihood of the web page being assumed to be "important". PageRank does not gather or deal with data related to the quality of web sites or web pages, or products/services offered on those web sites. Moreover, PageRank may be manipulated by a malicious group of web pages (see Pagerank Increase Under Different Collusion Topologies, Ricardo Baeza-Yates et al. at http://airweb.cse.lehigh.edu/2005/baezayates.pdf).

Another type of known system is "Trust rank" (see http://en.wikipedia.org/wiki/TrustRank) which was designed to semi-automatically separate legitimate web pages from spam. Trust rank works by starting with a small set of known and trusted web pages, which have been reviewed/evaluated by an expert in the field. This small set of known trusted pages is then crawled recursively. Other web pages to which the known trusted pages link are automatically assumed to also be good or trusted. The further away in the link chain a web page is from one or more of the known trusted web pages, the less likely the web page will be assumed to be good. Disadvantages of the Trust rank system include: (i) experts need to select then manually review/evaluate the initial set of known and trusted web pages; (ii) experts need to maintain the initial set/list of known and trusted web pages; (iii) experts need to re-review/re-evaluate the initial set of known and trusted web pages at regular intervals; and (iv) web pages which are close to the set of verified good pages may receive a high trust rank but may have never been evaluated by a human.

Another type of known system is "Site advisor" (see http://www.siteadvisor.com). Site advisor is similar to Trust rank, with differences including: (i) pages/sites are verified manually by volunteers; and (ii) linked pages are not crawled automatically. Each web page is evaluated by a reviewer. Reviewers can then manually update a database via a web interface to include their review of the web site.

This method of rating web sites has significant disadvantages. For example, potential users/purchasers of a web site, online product or service have no way of easily determining whether or not reviewer ratings are genuine. For example, a web site operator may submit a large number of high ratings, or feedback with excessive or untrue praise, for its own web site. That is, there is no presently known method for providing a weighted rating where the rating of all users may not be treated equally.

Likewise, potential users/purchasers have no way of readily determining whether reviews submitted on the Internet, including web forums, are in fact spam, paid advertisements or part of a marketing strategy, as opposed to unbiased opinions.

Additionally, reviewers of web sites are not presently able to be provided with a relatively convenient and central means for substantially instantaneously providing feedback on the quality or rating of web sites without being required to navigate away from the actual web site under review. Another disadvantage of the Site advisor system is a reviewer is required to manually log into a web interface to post a review.

DEFINITIONS

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (i.e., the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

There is a need for a method, system and/or computer product for providing a rating or ranking for a web site and/or associated service which addresses or at least ameliorates problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

In one form there is provided a method of (and associated system and computer program product for) providing a rating for a web site. The rating is obtained from a plurality of member users of the web site. A member user submits feedback data, the feedback data related to the web site. One or more member users submitting feedback data have a member user weighting obtained from one or more other member users. The rating for the web site is determined (or otherwise calculated) based on the feedback data and member user weightings of member users who submitted the feedback data.

According to a first broad form, the present invention provides a method of providing a rating for a web site, the rating obtained from one or more member users, the method including: a member user submitting feedback data, the feedback data relating to the web site and the member user having a member user weighting; and, determining the rating for the web site at least partially based on the feedback data and the member user weighting.

According to a second broad form, the present invention provides a system for providing a rating for a web site, the rating obtained from one or more member users, a member user submitting feedback data, the feedback data relating to the web site, the system including: a database to store a member user weighting; and, a processor to determine the rating for the web site at least partially based on the feedback data and the member user weighting.

According to a third broad form, the present invention provides a computer program product for use in providing a rating for a web site, the rating obtained from one or more member users, the computer program product providing an interface configured to enable a member user to submit feedback data, the feedback data relating to the web site, the member user having a member user weighting, and wherein the determination of the rating for the web site is at least partially based on the feedback data and the member user weighting.

In accordance with specific optional embodiments, provided by way of example only: the feedback data can be submitted by a member user while the web site is being displayed on the member user's terminal or the feedback data can be submitted by a member user while the member user is using the web site.

Optionally, but not necessarily, a selection of web sites are ranked according to the rating of each of the selected web sites.

Preferably, though not necessarily, a member user weighting is determined by one or more other member users having previously rated previous feedback data of the member user in respect of at least one other web site.

In accordance with other specific optional embodiments, provided by way of example only: a member user weighting is dynamic and can change when one or more other member users rate new feedback data submitted by the member user; a non-member user can access at least part of the database via a front end interface; the non-member user is provided with the rating of the web site; the non-member user is provided with the ranking of the selection of web sites; the front end interface is part of a search engine; and/or the selection of web sites is provided to the non-member user as a list in order of ranking.

Optionally, but not necessarily, the interface on a member user terminal is one or more of the group of: at least one feedback data submission tool provided in a separate program window; at least one feedback data submission tool embedded in the web site; at least one feedback data submission tool provided in a web browser plug-in; at least one feedback data submission tool provided in client-side software; at least one feedback data submission tool provided in a web browser frame; at least one feedback data submission tool provided by a javascript program; and, at least one feedback data submission tool provided as a pop-up window.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
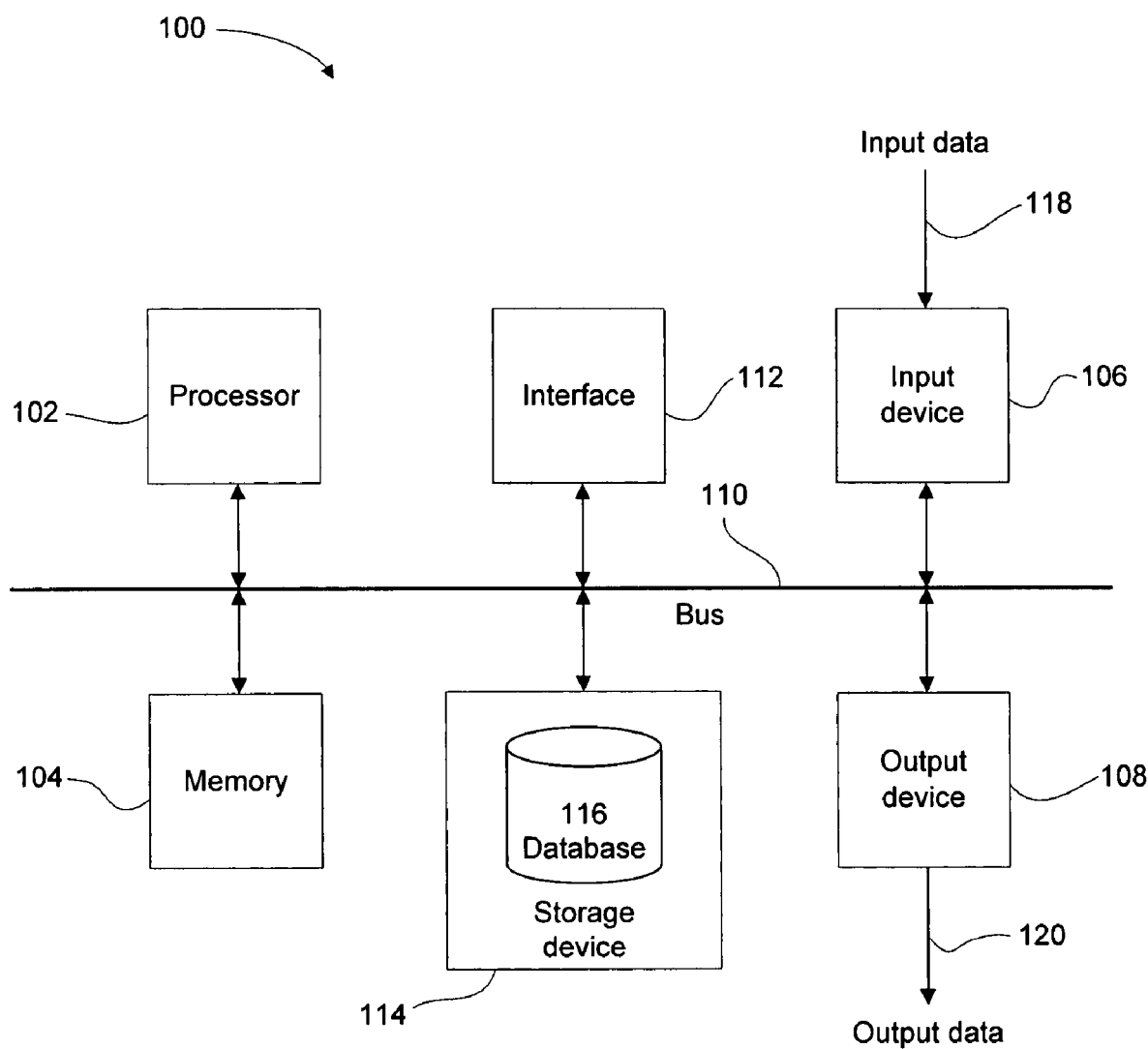
FIG. 1 illustrates a functional block diagram of an example processing system that can be utilised as a member user terminal.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Processing System

A particular embodiment of a member user terminal can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one local database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port, for example a USB port, a peripheral component adaptor, a data transmitter or antenna such as a modem or network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the local database 116 or remote databases via a network. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided, output data 120 may be sent to a remote server via a network. It should be appreciated that the processing system 100 may be any form of terminal, server, specialised hardware, or the like. Processing system 100 is adapted to communicate with other terminals, for example a database server, by sending and receiving data via a network, thereby facilitating communication of data.

Overview

The quality of a web site can be determined by feedback from a community of member users. Each member user of this community is preferably provided with an interface to a database, for example the interface is provided on a member user terminal that may be processing system 100. Each member user of the community may submit feedback data via a software interface regarding the quality of the web site or associated service the member user is currently using or visiting. Feedback data can be submitted substantially instantaneously from a member user's terminal over a network to the database.

Member users are also ranked by other member users in the community. This may be based on the perceived worthiness of previous feedback data submitted by a member user. Therefore, a first member user who has received more votes from other member users ranking the first member user's feedback as useful can receive a higher member user ranking, that is, a greater member user weighting. This in turn means the opinion of such a member user is appropriately weighted to factor into the overall quality rating or ranking of a web site or service for which the member user has submitted feedback data. Conversely, if a member user receives lower ratings, negative votes or the like, based on the member user's past feedback, this can have the opposite effect whereby the member user's future feedback is considered less worthy and is attributed appropriately less weighting.

Each member user of the community can be provided with the ability to view the current quality rating of a web site or service which the member user is currently using.

When different web sites are each attributed an overall rating, preferably by a plurality of member users of the community, the different web sites may then be ranked against each other. Different web sites in a similar category, for example anti-virus web sites or web sites offering online product purchases, could be listed in a ranking list based on the overall rating for each of the web sites. The rating for an individual web site, or a ranking of a selection of web sites, can then be displayed to a non-member user, which would typically be a member of the general public.

For example, ranking of different web sites may be displayed to a non-member user in a search results list when the non-member user connects to a front end of a database which stores the rating/ranking information of web sites or associated services. Such ranking lists may be provided as search results. When a non-member user utilises a front end to the ranking database in the form of a search engine, the search results can be returned in order of quality ranking, that is with web sites having a higher overall rating being listed above or before those attributed with a lower overall rating.

Rating Submission

Figure 2:
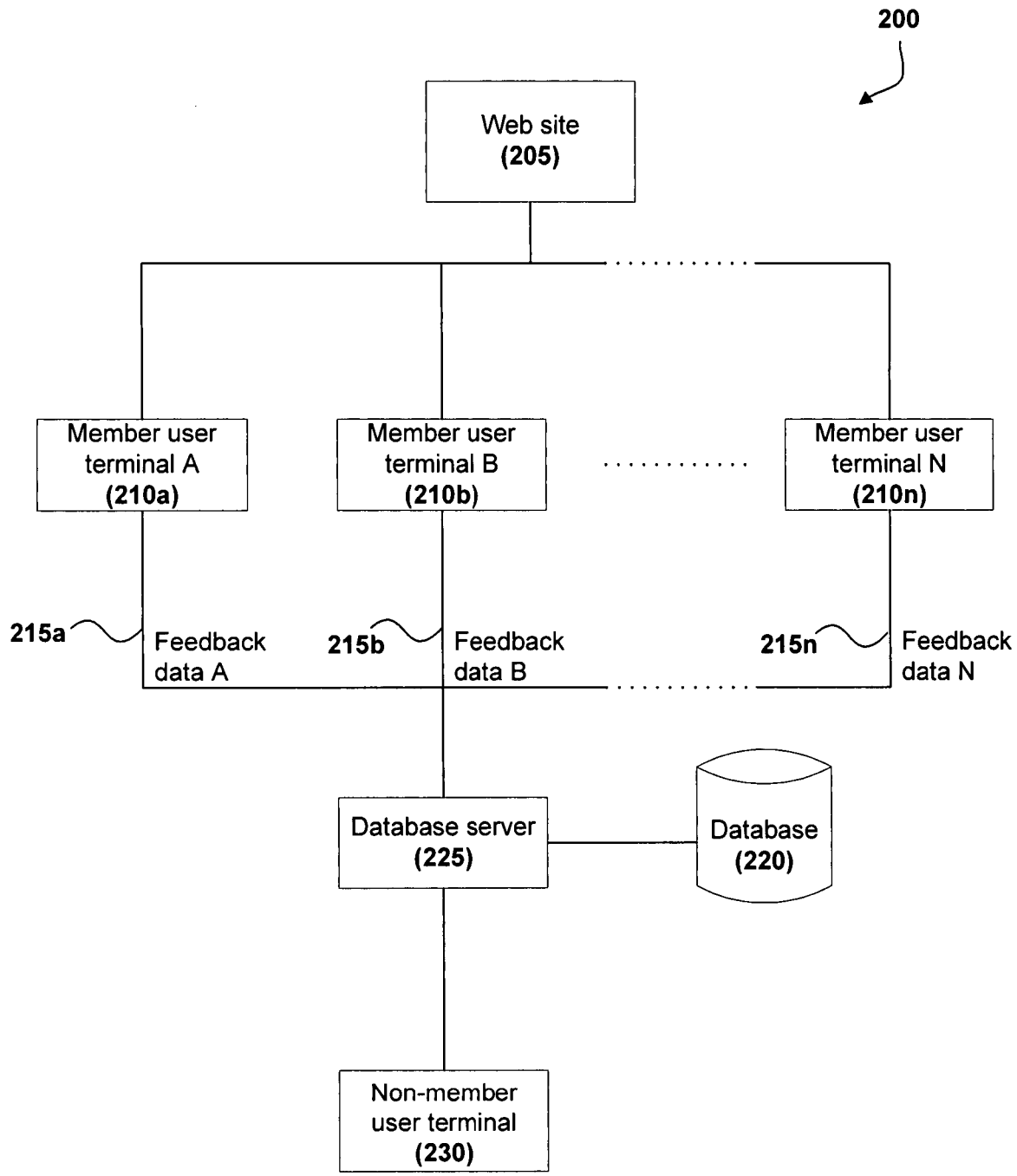
FIG. 2 illustrates an block diagram of an example system providing a particular embodiment.

Referring to FIG. 2, there is illustrated a block diagram of an example system 200. In system 200 the subject web site 205 is being rated by member users A, B, . . . N. Each member user A, B, . . . N is operating member user terminal A 210a, member user terminal B 210b, . . . member user terminal N 210n, respectively. When member user A desires to submit a rating for web site 205, member user A causes member user terminal A 210a to submit feedback data 215a to database 220 via database server 225. Likewise, when member user B desires to rate web site 205, member user B causes member user terminal B 210b to submit feedback data 215b to database 220 via database server 225. This process is repeated, typically not simultaneously by each member user who desires to submit a rating for web site 205.

Submission of feedback data 215a to database 220 is substantially instantaneous when member user A effects submission of feedback data 215a via member user terminal A 210a. Feedback data 215a can be transmitted from member user terminal A 210a to database server 225 via a network (not illustrated). Other member users, for example member user B, may submit feedback data at a different time to member user A.

Feedback data 215a, 215b, 215n are received in database 220 together with any associated member user weightings so as determine the overall rating for web site 205 based on the individual ratings from member users, which are embodied in the feedback data.

A non-member user, for example a potential user/purchaser of web site 205 or products provided thereon, can access information in database 220 via a front end provided by database server 225 by using non-member user terminal 230. This allows the potential user/purchaser to view a rating/ranking for web site 205 where ratings have been submitted by one or more member users A, B, . . . N rating web site 205, and furthermore where the contribution of each member user A, B, . . . N themselves is weighted.

Figure 3:
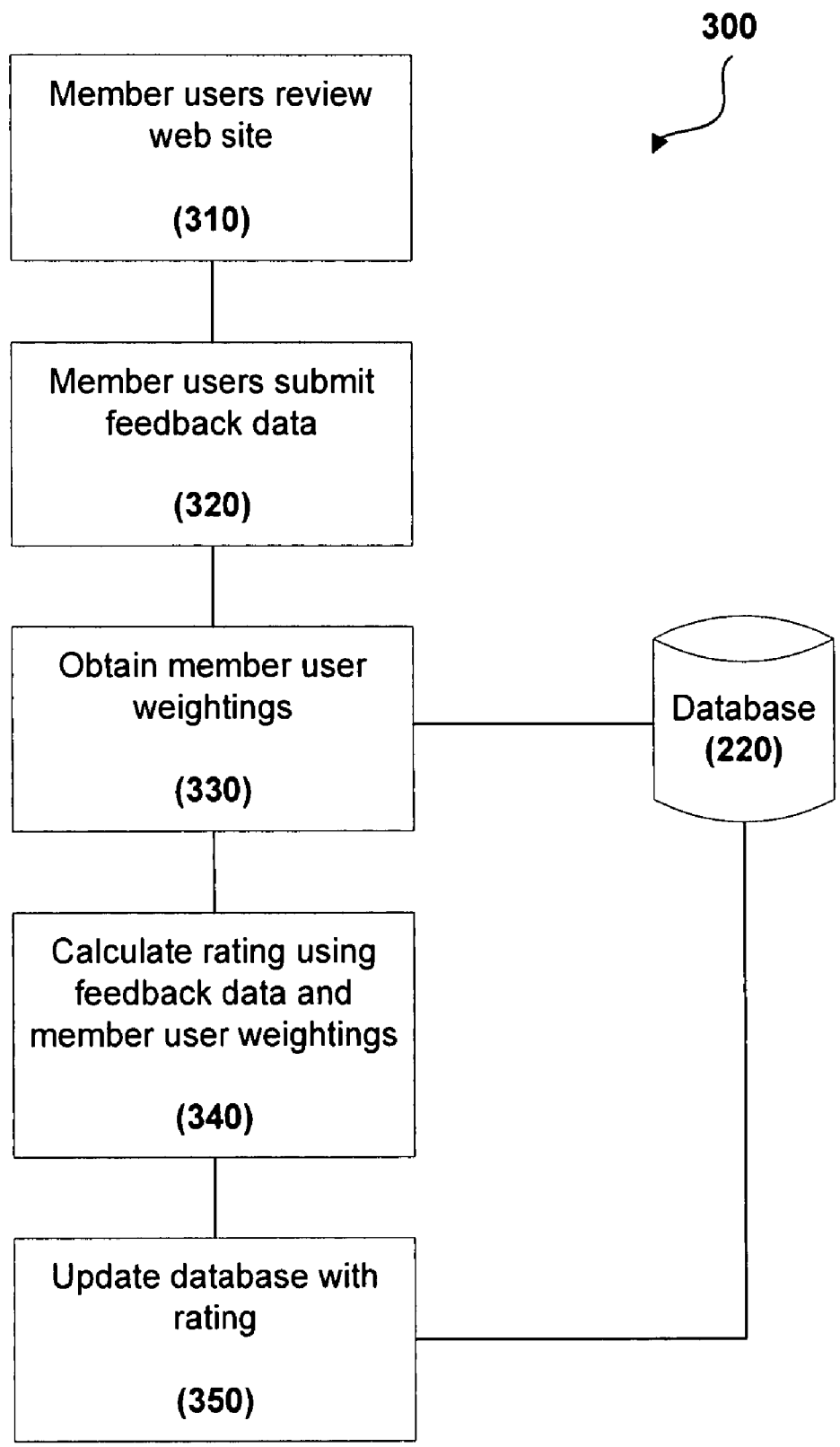
FIG. 3 illustrates steps of a method providing a particular example embodiment.

Referring to FIG. 3, there is illustrated a method 300 of providing a rating for a web site, the rating obtained from a plurality of member users viewing/using the web site. At step 310 one or more member users reviews the web site. At step 320, one or more member users each submit feedback data using an interface provided on each member user's terminal, the feedback data relating to the web site. At step 330, a member user weighting is obtained for each member user who has submitted feedback. At step 340, a rating for the web site is calculated using the feedback data submitted by member users and also using member user weightings for each of the member users that submitted feedback data. At step 350, database 220 is updated with the calculated overall rating. The calculated rating is preferably dynamic and can be updated each time a different member user submits feedback data to database 220.

Figure 4:
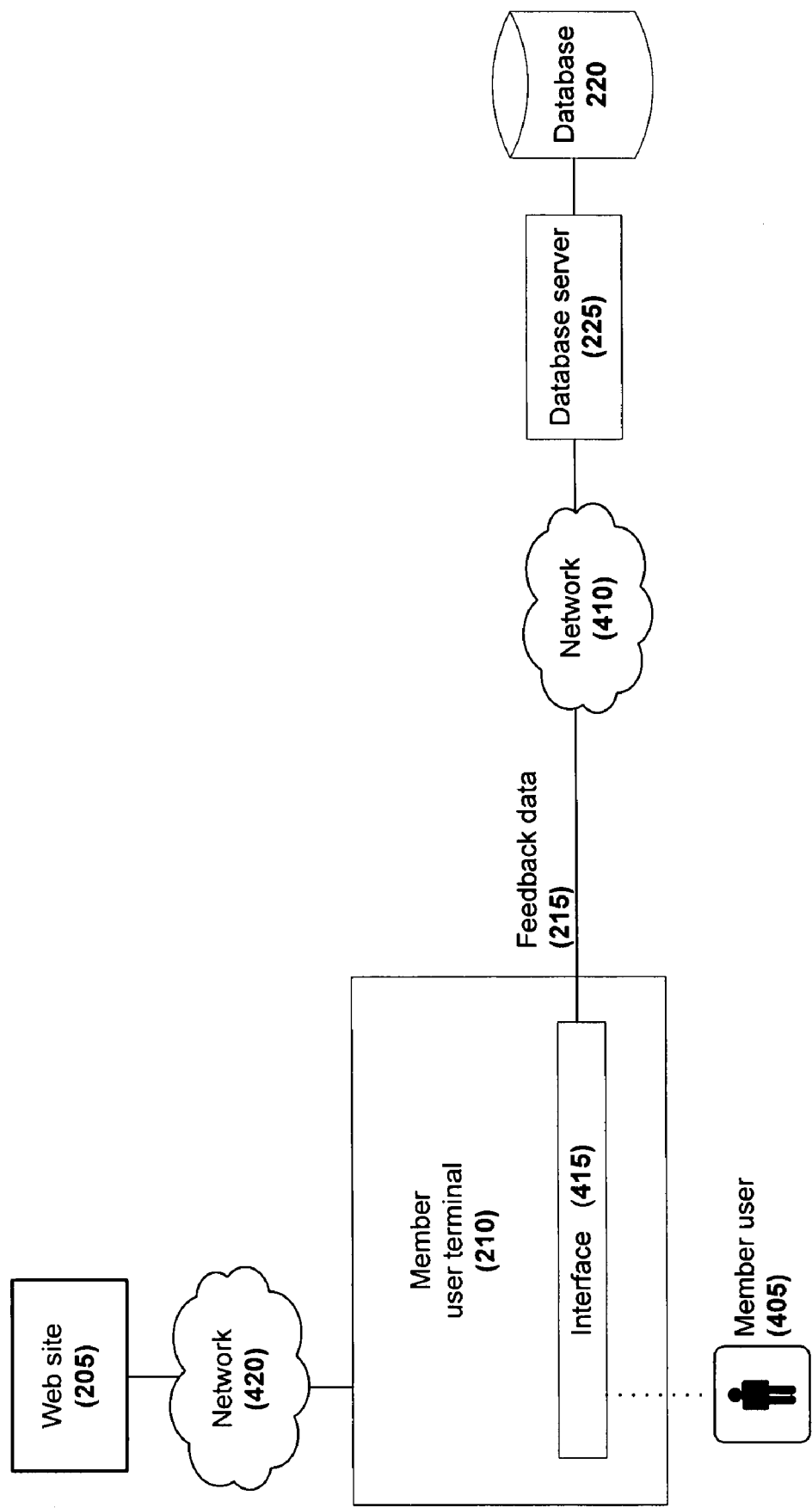
FIG. 4 illustrates example features of a member user terminal.

Referring to FIG. 4, further details of a particular embodiment are illustrated. Member user 405 operates member user terminal 210. Web site 205 is accessed via network 420. Member user 405 utilises interface 415 to rate web site 205 and causes feedback data 215 to be transmitted over network 410 to database 220 via database server 225. Network 410 may be the same as network 420.

Figure 5:
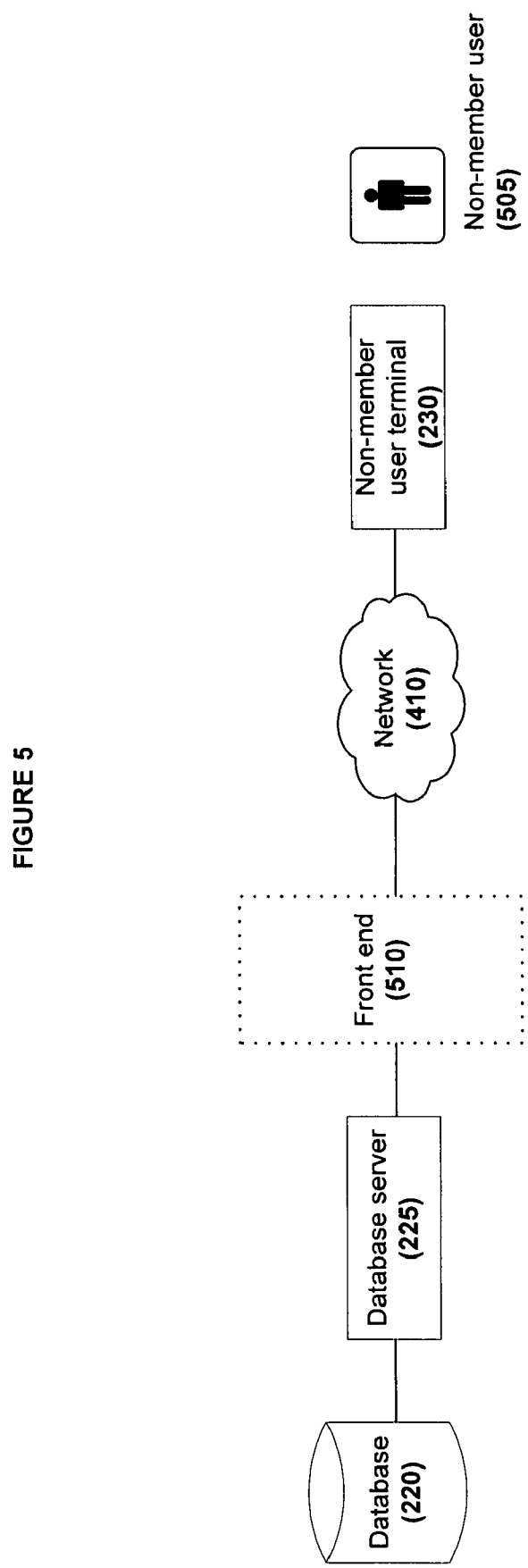
FIG. 5 illustrates example features of a front end utilised by a non-member user.

Referring to FIG. 5, non-member user 505, for example a potential user of web site 205, can request rating or ranking information related to web site 205 from database 220. This is achieved by non-member user 505 operating non-member user terminal 230 to interact with front end 510 of database 220/database server 225 via network 410.

Member User Interface

Feedback data 215 can be submitted by member user 405 simultaneously while viewing web site 205 on member user terminal 210. Likewise, feedback data 215 can be submitted by member user 405 while member user 405 is remotely using web site 205 or associated services. This is achieved by use of an interface 415.

For example, interface 415 on member user terminal 210 provides at least one feedback data submission tool. The at least one feedback data submission tool provided by interface 415 could involve member user 405 selecting a number of rating icons, for example rating "stars", selecting a sliding bar scale, manually inputting a rating, for example a percentage, or any other number of means for providing a rating for a web site or service.

The submission tool may be provided in a separate program window to the member user's web browser used to view web site 205. Alternatively, the feedback data submission tool can be embedded in a title bar of the member user's web browser. Also alternatively, the feedback data submission tool could be provided as a pop-up window activated by member user 405 clicking an icon, which may or may not be directly associated with web site 205 or the member user's web browser.

The feedback data submission tool could be embedded in web site 205 itself or may be provided as a web browser plug-in. Broadly, the feedback data submission tool can be provided as any form of client-side software. For example, the feedback data submission tool could be provided in a web browser frame, provided by a javascript program or provided as an automatically launching pop-up window.

Interface 415 can also provide more than one form of feedback data submission tool, for example a "star" or icon based rating system either individually with or in combination with other types of rating systems, such as percentage rating. Ratings can be submitted for various aspects of web site 205 and/or web site 205 in general. That is, feedback data 215 may include a plurality of distinct ratings provided by member user 405 in relation to different aspects or functions of web site 205, for example: quality of products offered (eg. do products function as described?); quality of services offered; ease of navigation; load time; quality of privacy/data retention policy; and/or level of security provided for transactions, etc.

When feedback data 215 is transmitted to database 220, data indicating or identifying member user 405 is also preferably provided. This allows feedback data 215 to be linked to member user 405. Member user 405 is provided with a member user weighting that has been determined by one or more member users having previously rated earlier feedback data submitted by member user 405 in respect of other web sites. However, it should be noted that it is possible that a member user weighting could be calculated based on feedback or other factors not related to earlier submitted ratings, for example a member user weighting may be affected by the member user's ratings of other products/services, eg. software products not related to web sites or general peer reviews. This historical data allows a member user weighting to be determined that can then be associated with new feedback data 215 submitted by the member user in respect of web site 205. A member user weighting is dynamic and can change when one or more other member users rate new feedback data submitted by member user 405. If a member user does not yet have an associated member user weighting, for example if the member user is new, a default member user weighting can be allocated to the member user. For example the default member user weighting may be 75%, which could be a base weighting which is amended when other member users rate the member user, or could be replaced entirely when other member users rate the member user.

Non-Member User Interface

Front end 510 allows non-member user 505 access to the overall rating of web site 205 stored in database 220. Only member users can see individual ratings by other member users to enable member users to rate each others feedback data to thereby determine each respective member user's weighting. Non-member user 505 does not contribute to rating web sites or, optionally but not necessarily, a member user weighting, which significantly reduces the problem of biased rating of web sites.

Non-member user 505 may also access front end 510 to obtain a ranking of a selection of web sites, with the ranking based on the overall rating for each of the web sites. For example, front end interface 510 may be part of a search engine which queries database 220 and is provided with rating and/or ranking information for display to non-member user 505.9. Front end interface 510 may also be implemented in the form of an advertising server, or products/web sites recommendation plug-in for a search engine or other type of front end. Advertising/recommendations can be listed in order of quality rating, and/or the quality rating of advertising/recommendations can be determined by making use of rankings stored in database 220.

Interface 415 on member user terminal 210 thus provides a computer program product for use in providing a rating for a web site 205.

Search Results

Figure 6:
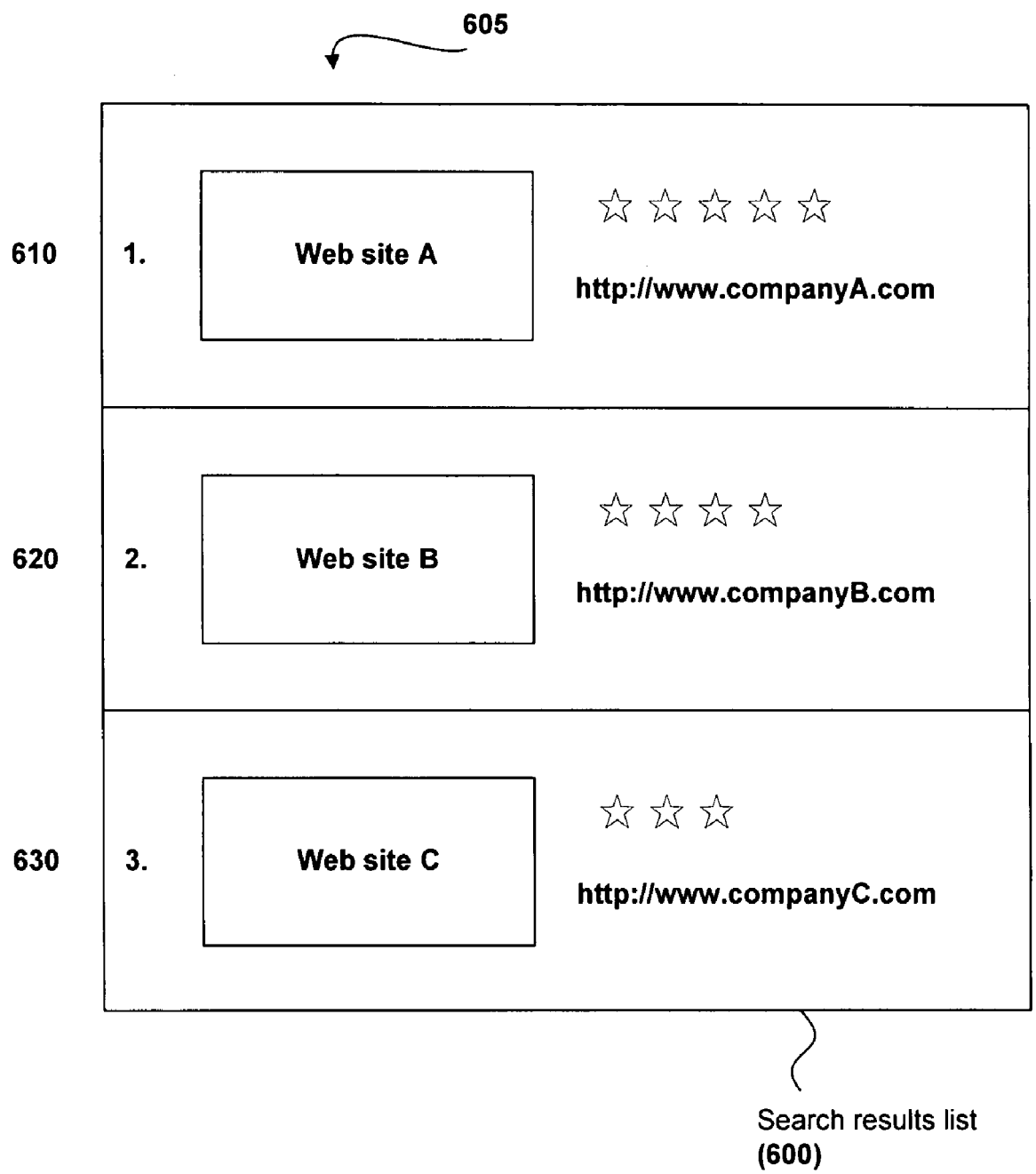
FIG. 6 illustrates an example search results list of selected web sites.

Referring to FIG. 6, there is illustrated an example search results list 600 that could be obtained by non-member user 505 using front end 510 to database 220. For example, if non-member user 505 submits a search for antivirus software web sites, a selection of web sites 605, with each web site being related to antivirus software, can be displayed. Results are ranked: web site A in row 610 has been provided with a rating of 5 stars, and is listed above web site B, shown in row 620 and provided with a rating of 4 stars, which in turn is displayed above web site C, shown in row 630 and provided with a rating of 3 stars. This facilitates ready identification by non-member user 505 that web site A presented in row 610 is rated most highly of the displayed web sites by the member users when member users weighting have been taken into account. Categories of web sites can be utilised, for example a user could search for a specific category by keyword, or navigate to a specific category using predefined categories or subject groupings. Categories could also include a wide variety of other factors, including for example geographic location or language of contents, eg. English or Japanese.

Other Aspects

In various non-limiting embodiments, database 220 has the ability to store information relating to the quality of web sites or services, this information may include, but should not be considered to be limited to: quality of products offered (eg. do products function as described?); quality of services offered; ease of navigation; load time; quality of privacy/data retention policy; level of security provided for transactions; does the web site function as described?; Graphical User Interface of the web site; ease of use; use of system resources; documentation or help; overall impression; do products provided on the web site crash?; and/or does the web site generate spam, etc.

Member users can be selected according to a wide variety of criteria, and may or may not be, for example, professional web site developers, reviewers or journalists. Member users have access to database 220. Access to database 220 is via client-side software, for example a desktop application which preferably runs continuously on the member user's terminal. Client-side software can detect a currently used web site and allows the member user to rate the current web site on selected criteria, for example the criteria mentioned hereinbefore regarding information that may be stored in database 220.

Client-side software provides interface 415 that may provide, by way of example, the following: an "always on top" window containing one or more slide bars; an "always on top" window containing one or more sets of 5 stars which are clickable; a widget embedded in the currently running web browser title bar containing one or more slide bars; and/or one or more sets of 5 stars which are clickable; and/or a widget embedded in the currently running web browser title bar which when clicked by the member user pops up a menu of available rating/ranking options.

Database 220 may contain provisions for preventing abuse of the service from member users, for example preventing submissions of multiple ratings for a single web site from a single member user. Member users who repeatedly report web site quality or ratings outside of a standard deviation for a particular web site could be temporarily or permanently barred from being a member user.

Database server 225, by querying information in database 220, can determine the overall rating or ranking of a web site based on a statistical analysis of rating metrics and member user ratings.

Member users can also be provided with the ability to query database 220 to determine the quality of a web site which they are currently using. The query may be performed automatically by client-side software, may be performed on downloading of installation files, or may be performed when a link is detected in the member user's web browser, irrespective of whether that link has been clicked or not.

Query results may be displayed to a community member user when the member user navigates to a web page or web site, or relating to a new web page or web site about to be navigated to by the member user.

Non-member users who are not members of the trusted community of member users may only access database 220 via front end 510, for example via a dedicated web site or search engine. Front end 510 to database 220 may also be a web site recommendation service which alerts non-member users on the highest ranking web sites from user defined categories. For example, alerts may be in the form of, but not limited to: notifications from a software application; e-mail notifications; SMS notifications; and/or WAP push notifications. Where the front end is a desktop application, the application may semi-automatically navigate to the current highest ranking web site.

Interface 415 or front end 510 may be implemented separately, or in combination with currently known solutions as a software package and/or online service. Interface 415 or front end 510 may be accessed by any form of suitable terminal, for example a PC, PDA, cellular or mobile telephone, etc. In a particular embodiment, client-side software/interface, may operate on Microsoft Windows and server-side software may utilise Linux, however, embodiments of the present invention can be applied to any modem operating system or combination of modern operating systems.

Example Rating Calculation

A particular, but non-limiting example of determining a rating of a web site, based on ratings from member users is now provided. Assume there are three member users A, B and C. Also assume that based on previous ratings of web sites (or other non-web site ratings) member user A has been rated an average of 3.5 out of 5 by member users B and C. Also assume that based on previous ratings member user B has a rating of 4 out of 5 and member user C a rating of 4.5 out of 5, as an averaged weighting by their fellow member users. This provides member user weightings of 0.292 (3.5/12), 0.333 (4/12) and 0.375 (4.5/12) for member users A, B and C, respectively, out of the total available weighting of 12 (3.5+4+4.5) available for all member users A, B and C that are rating a new web site. Assuming member users A, B and C rate the new web site as 4/5, 3/5 and 5/5, respectively, then the average weighted rating for the new web site can be said to be 4.042 (calculated as 4×0.292+3×0.333+5×0.375). Thus, the rating for the new web site may be approximated to be 4 out of 5 which has also taken into account member user weightings by other member users.

It should be noted that this type of calculation is provided as an example only and many other methods of calculating a weighted rating could be utilised. Member users A, B and C could then assess what each other member user submitted as an individual rating for the new web site and update their rating of the other member users based on their perception of the accuracy of the other members individual ratings. Thus, each member user weighting could be different in the calculation of the overall rating for another web site.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

Aspects of the present invention may take the form of an entirely hardware embodiment, an entirely software embodiment, or an embodiment combining software and hardware aspects.

The invention claimed is:

1. A computer-implemented method of providing a rating for a web site, the rating obtained from one or more member users, the method including:
   on a user terminal, receiving feedback data submitted by a user using a graphical user interface (GUI) provided on the user terminal, the feedback data relating to the web site;
   determining, by a processor, whether the user is classified as a member user, wherein the user is classified as a member user when the user satisfies at least one predetermined criteria;
   upon determining that the user is classified as a member user, storing, by the processor, the received feedback data relating to the web site in a database;
   upon determining that the user is classified as a non-member user, does not contribute to the feedback data of the web site;
   preventing, by the processor, the feedback data received from a member user from being accessed by a non-member user;
   allocating, by the processor, an average member user weighting to the member user, wherein the average member user weighting is obtained by one or more other member users rating previous feedback data of the member user; and
   calculating, by the processor, an overall rating for the web site at least partially based on a combination of the feedback data and the average member user weighting.

2. The method as claimed in claim 1, wherein determining the overall rating for the web site is based on a plurality of feedback data and a plurality of respective member user weightings from a plurality of member users.

3. The method as claimed in claim 1, wherein the feedback data is submitted by the user while the web site is being displayed or used on the user terminal.

4. The method as claimed in claim 1, wherein a selection of web sites are ranked according to the overall rating of each of the selected web sites.

5. The method as claimed in claim 1, wherein the average member user weighting is altered based on the one or more other member users rating the previous feedback data of the member user.

6. The method as claimed in claim 1, wherein the non-member user accesses at least part of a database storing the overall rating of the web site via a front end interface.

7. The method as claimed in claim 6, wherein the non-member user accesses the overall rating of the web site.

8. The method as claimed in claim 6, wherein the non-member user accesses a ranked list of a selection of web sites.

9. The method as claimed in claim 6, wherein the front end interface is part of a search engine.

10. A system for providing a rating for a web site, the rating obtained from one or more member users, a member user submitting feedback data using an interface provided on a member user terminal, the feedback data relating to the web site, the system including:
    a database configured to store an average member user weighting;
    a processor configured to:
      receive feedback data submitted by a user using a graphical user interface (GUI) provided on a user terminal, the feedback data relating to the web site;
      determine whether the user is classified as a member user, wherein the user is classified as a member user when the user satisfies at least one predetermined criteria;
      upon determining that the user is classified as a member user, store the received feedback data relating to the web site in the database;
      upon determining that the user is classified as a non-member user, does not contribute to the feedback data of the web site;
      prevent the feedback data received from a member user from being accessed by a non-member user;
      allocate an average member user weighting to the member user, wherein the average member user weighting is obtained by one or more other member users rating previous feedback data of the member user; and
      calculating an overall rating for the web site at least partially based on a combination of the feedback data and the average member user weighting.

11. The system as claimed in claim 10, wherein the database stores the rating for the web site.

12. A computer program product for providing a rating for a web site, the computer program product comprising a computer-readable storage device having instructions thereon, the instructions comprising:
    code programmed to receive feedback data submitted by a user using a graphical user interface (GUI) provided on a user terminal, the feedback data relating to the web site;
    code programmed to determine whether the user is classified as a member user, wherein the user is classified as a member user when the user satisfies at least one criteria;
    upon determining that the user is classified as a member user, code programmed
      to store the received feedback data relating to the web site in a database;
    upon determining that the user is classified as a non-member user, does
      not contribute to the feedback data of the web site;
    code programmed to prevent the feedback data received from a member user from being accessed by a non-member user;
    code programmed to obtain the rating for the web site from one or more member users;
    code programmed to determine an average member user weighting for the member user, wherein the average member user weighting is obtained by one or more other member users rating previous feedback data of the member user; and
    code programmed to calculating an overall rating for the web site, wherein the overall rating is determined at least partially based on a combination of the feedback data and the average member user weighting.

13. The computer program product as claimed in claim 12, wherein the determination of the overall rating for the web site is based on a plurality of feedback data and a plurality of respective member user weightings from a plurality of member users.

14. The computer program product as claimed in claim 12, wherein the interface on the user terminal is one or more of a group of:
    at least one feedback data submission tool provided in a separate program window;
    at least one feedback data submission tool provided in client-side software;

at least one feedback data submission tool provided by a javascript program; and at least one feedback data submission tool provided as a pop-up window.

15. The computer program product as claimed in claim 12, wherein the interface on the user terminal is one or more of a group of:

at least one feedback data submission tool embedded in the web site;

at least one feedback data submission tool provided in a web browser plug-in; and at least one feedback data submission tool provided in a web browser frame.

* * * * *